US007765115B1

(12) United States Patent
Davies et al.

(10) Patent No.: US 7,765,115 B1
(45) Date of Patent: Jul. 27, 2010

(54) ONLINE SYSTEM AND METHOD FOR PROCESSING LIFE INSURANCE APPLICATIONS

(75) Inventors: Jennifer Victoria Davies, Kirkland, WA (US); Laura Ann Johnson, Seattle, WA (US); Kathleen Marie Methven, Snoqualmie, WA (US); Kaley Donnelly, Mukilteo, WA (US); Noah Nathaniel Miles, Bellevue, WA (US); Debora Ann Wilhelm, Lynnwood, WA (US); Brandon H. Knowles, Redmond, WA (US); Alissa C. Moeller, Redmond, WA (US); John Joseph Higley, Snohomish, WA (US); Douglas Steven Carey, Kirkland, WA (US); Wendell Tobiason, Snohomish, WA (US); Charlene E. Hallstaff, Montrose, CO (US); James FerneKeith Besso, Olympia, WA (US); Michael Edward Madden, Seattle, WA (US); Bradley James Moore, Monroe, WA (US); Joelle Juleann Pozniak, North Bend, WA (US); Jerald A. Walle, Tacoma, WA (US)

(73) Assignee: Symetra Life Insurance Company, Bellevue, WA (US)

( * ) Notice: Subject to any disclaimer, the term of this patent is extended or adjusted under 35 U.S.C. 154(b) by 1266 days.

(21) Appl. No.: 10/685,290

(22) Filed: Oct. 14, 2003

(51) Int. Cl.
*G06Q 40/00* (2006.01)
(52) U.S. Cl. .......................................................... 705/4
(58) Field of Classification Search .................. 705/2–4
See application file for complete search history.

(56) References Cited

U.S. PATENT DOCUMENTS

| 4,567,359 | A | 1/1986 | Lockwood |
| 4,831,526 | A | 5/1989 | Luchs et al. |
| 4,975,840 | A | 12/1990 | DeTore et al. |
| 5,191,522 | A | 3/1993 | Bosco et al. |
| 5,523,942 | A | 6/1996 | Tyler et al. |
| 5,537,315 | A | 7/1996 | Mitcham |

(Continued)

OTHER PUBLICATIONS

Life insurance cover: There won't be more to it than meets the eye, Financial Express, May 14, 2003.*

(Continued)

*Primary Examiner*—Gerald J. O'Connor
*Assistant Examiner*—Sheetal R Rangrej
(74) *Attorney, Agent, or Firm*—Christensen O'Connor Johnson Kindness PLLC

(57) ABSTRACT

A method and system for online processing of life insurance applications includes receiving information that identifies an individual to be insured and describes the insurability of the individual. A certification may be received via an electronic data communications link confirming whether an illustration of a life insurance policy was delivered to the policy applicant. Furthermore, information may be received via an electronic data communications link from a third party confirming the identity of the individual to be insured. When a commitment to purchase the policy is received, a personalized temporary insurance certificate may be issued to the applicant, preferably accompanied by a temporary insurance agreement specifying the terms of temporary life insurance coverage extended to the individual. An authorization may also be received via an electronic data communications link authorizing immediate collection of medical history information from one or more third parties concerning the individual to be insured.

22 Claims, 16 Drawing Sheets

U.S. PATENT DOCUMENTS

| | | |
|---|---|---|
| 5,611,052 A | 3/1997 | Dykstra et al. |
| 5,797,134 A | 8/1998 | McMillan et al. |
| 5,809,478 A | 9/1998 | Greco et al. |
| 5,845,256 A | 12/1998 | Pescitelli et al. |
| 5,873,066 A | 2/1999 | Underwood et al. |
| 5,884,274 A | 3/1999 | Walker et al. |
| 5,930,760 A | 7/1999 | Anderton et al. |
| 6,119,093 A * | 9/2000 | Walker et al. ............ 705/4 |
| 6,347,302 B1 | 2/2002 | Joao |
| 6,456,979 B1 * | 9/2002 | Flagg ............ 705/4 |
| 7,080,020 B1 * | 7/2006 | Klaus ............ 705/4 |
| 7,143,051 B1 * | 11/2006 | Hanby et al. ............ 705/4 |
| 7,240,017 B2 * | 7/2007 | Labelle et al. ............ 705/4 |
| 2002/0111835 A1 | 8/2002 | Hele |
| 2002/0116231 A1 * | 8/2002 | Hele et al. ............ 705/4 |
| 2002/0120474 A1 | 8/2002 | Hele |
| 2002/0147618 A1 * | 10/2002 | Mezrah et al. ............ 705/4 |
| 2003/0055767 A1 * | 3/2003 | Tamura et al. ............ 705/36 |
| 2003/0144887 A1 * | 7/2003 | Debber ............ 705/4 |

OTHER PUBLICATIONS

"Report of Accomplishments 1995-1998 'Protecting California's Consumers' Expanded Access to Insurance Information," California Department of Insurance, Mar. 1999, <http://web.archive.org/web/20000819132020/http://www.insurance.ca.gov/EXECUTIVE/Protecting_California's_Consumers/expanded.pdf> [retrieved Feb. 24, 2003].

MostChoice Advisor Web site, Aug. 2000, <http://web.archive.org/web/20000818065246/www.mostchoice.com/General/Advisor_Center/Why/G_Adv_Why_Overview.cfm>.

Web page showing that MostChoice's Web site is under construction, © 2000, <http://web.archive.org/web/20000818065635/www.mostchoice.com/under_construction.cfm> [retrieved May 8, 2003].

Safeco Term Life Quote, Step Three—Apply Online, © 1999-2002, <https://www3.safeco.com/lifenetconnection/Apply4.asp?FromPg=Apply2.ASP>.

Safeco Term Life Quote, Step Four—Agent Selection, © 1999-2002, <https://www3.safeco.com/lifenetconnection/Apply6a.asp>.

* cited by examiner

FIG. 3.

XYZLIFE INSURANCE - MICROSOFT INTERNET EXPLORER

FILE  EDIT  VIEW  FAVORITES  TOOLS  HELP

BACK  FORWARD  STOP  REFRESH  HOME  SEARCH  FAVORITES  HISTORY  MAIL  SIZE  PRINT

LINKS »  ADDRESS [HTTP://WWW.XYZLIFE.COM]   ▼ GO

— 160

XYZLIFE UNIVERSAL LIFE QUOTE  — 162

INSURED

Insurance Amount  $ 250,000  ($25,000 minimum)  — 164
Application State  WASHINGTON ▼

Gender  ⊙ Male   ○ Female
Age  ⊙ Current Age  35
     ○ Birthdate

Rate Class  ⊙ Standard Nonsmoker  ○ Standard Smoker    Rate Class Calculator — 168

Additional Term Rider? _____

— 170
— 166

[ Get Quote ] — 172

FIG. 6.

Application for <Insured> 238

240 — Health and Existing Policy Information

242 — Hospitalization — Within the past 90 days, has the proposed insured been hospitalized? ◯ Yes  ◯ No 244 — Health Information — In the past two years, has the proposed insured been treated for: heart attack, stroke, coronary artery disease, cancer, alcohol, drugs, or Acquired Immunodeficiency Syndrome (AIDS)/AIDS-Related Complex (ARC) by a medical professional? ◯ Yes  ◯ No 246 — If either of the above questions is answered "yes" or left blank, or if the requested amount exceeds $1,000,000, no premium may be collected and no coverage is in effect under the Temporary Life Insurance Agreement. ← 248

FIG. 10.

Certificate of

Temporary Insurance

From XYZLife Insurance Company

For

|  |  |
|---:|:---|
| Primary | PETER M. INSURED |
| Amount Applied For | $500,000 |
| Amount of Temporary Coverage | $250,000 |

Additional Term Rider:
Amount Applied For:
Amount of Temporary Coverage:

|  |  |
|---:|:---|
| Application Number: | AA3901009 |
| Annual Premium: | $3,150.00 |

XYZLife's Temporary Insurance Agreement provides immediate life insurance coverage for the amount applied, up to $225,000. This guarantees coverage while your application is underwritten, up to a maximum of 90 days. Refer to the Temporary Insurance Agreement for a complete description of coverage.

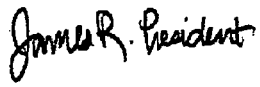

James R. President
President
XYZLife Insurance Company

TEMPORARY LIFE INSURANCE AGREEMENT

AMOUNT OF COVERAGE: If the Temporary Life Insurance questions have been answered "no" and if money has been accepted as advance payment for life insurance and the proposed insured dies while this temporary insurance is in effect, we will pay the beneficiary an amount equal to the lesser of:

(a)    the amount of all death benefits applied for with this application, including any accidental death benefits, if applicable; or (b)    a maximum amount under all Temporary Life Insurance Agreements with XYZLife Insurance Company of $250,000.

COVERAGE BEGINS: Life Insurance under this Agreement will begin on the date of this application, if Temporary Life Insurance questions have been completed and answered "no" and money equal to the first full premium has been accepted as advance payment for life insurance.

COVERAGE ENDS: Life insurance under this Agreement will terminate on the earliest of:

(a)    90 days from the date of this Agreement; or (b)    the date that insurance takes effect under the policy applied for; or (c)    the date a policy, other than as applied for, is offered to the applicant; or (d)    the date the Company mails notice of termination of coverage and a return of the payment to the applicant.

LIMITATIONS:

(a)    This Agreement does not provide benefits for disability.

(b)    Fraud or material misrepresentation in the application or in the answers to the questions of this Agreement invalidate this Agreement and the Company's only liability is for refund of the payment made.

(c)    If the proposed insured is less than 15 days old or more than 80 years old, the Company's liability under this Agreement is limited to a refund of the payment made.

(d)    If the proposed insured commits suicide, the Company's liability under this Agreement is limited to a refund of the payment made. (For citizens of Missouri, suicide is no defense unless we can show that the insured intended suicide when the application was completed.)

(e)    If the check or draft submitted as payment is not honored by the bank, there is no coverage under this Agreement.

(f)    No one is authorized to waive or modify the terms of this Agreement.

*FIG. 16*

ONLINE SYSTEM AND METHOD FOR PROCESSING LIFE INSURANCE APPLICATIONS

FIELD OF THE INVENTION

The present invention relates generally to insurance application processing, and more specifically, to a method and system for providing online processing of life insurance applications.

BACKGROUND OF THE INVENTION

In recent years, electronic commerce conducted has become increasingly popular with consumers. Consumers are able to identify and purchase a wide variety of goods and services. The ease of accessing and reviewing insurance information online, and the speed of electronic processing of data, has attracted consumers to insurance providers having an online presence.

Initially, insurance providers typically set up electronic sites, such as Internet Web sites, that enabled consumers to locate agents of the insurance providers. Consumers providing address information to an insurance provider's Web site would in return receive information identifying the closest agents of the insurance provider that were qualified for the type of insurance the consumers were seeking.

As time progressed, insurance providers began providing quotation services via the Internet. Insurance providers would calculate an estimated cost of insurance based on brief questionnaires provided to consumers regarding the insurability of an individual or property and the desired insurance. The quoted cost was typically accompanied by an invitation to the consumer to contact the insurance provider or one of its agents offline to pursue the insurance coverage.

Recognizing that consumers were increasingly willing to provide information needed for insurance coverage via the Internet, especially as transmission security improved, insurance providers began providing insurance application processes online in which consumers were given user friendly interfaces that enabled them to provide information required for an insurance application. Value-added software, such as insurance comparison tools, further enabled consumers to make intelligent choices concerning the purchase of insurance. Information received from consumers was then entered into one or more actual insurance application forms that the consumers could print onto paper, sign, and mail to the insurance provider. In this manner, the consumer was relieved of having to manually fill out an insurance application. These online tools also improved the accuracy of insurance applications, as they helped consumers enter appropriate information in the proper application fields.

In all of the foregoing systems and processes, certain deficiencies remain that prevent consumers from completing an insurance application process entirely online, without the need for additional follow-up in terms of submitting an actual insurance application. These deficiencies are particularly evident in the field of processing life insurance applications. For example, the National Association of Insurance Commissioners (NAIC) requires insurance providers to provide a full illustration of an insurance policy to persons applying for universal life insurance. At present, insurance providers use traditional paper methods to obtain a certification indicating whether the required illustration was provided.

Insurance providers may further require confirmation of a customer's identification, especially in circumstances where a simplified life insurance application process is concerned. Traditional methods of verifying a customer's identification require an agent to personally meet with the proposed insured and submit paper documentation to the insurance provider certifying the identity of the proposed insured.

Before issuing a life insurance policy, insurance providers typically review the medical history of the proposed insured to ensure an appropriate balance of the premium charged and the expected risks to be covered. Traditionally, insurance applicants submit paper documentation that authorizes the insurance provider to contact third parties and collect medical history information for the proposed insured. Insurance providers are precluded from collecting medical history information until this authorization is obtained, which may be delayed by several days or weeks until the paper documentation from the applicant is received and processed. This delay affects the timely processing of the insurance application.

In circumstances where types of insurance coverage have been provided through an online process, insurance applicants are frequently left without a clear picture of the insurance policy they acquired. This problem is further exacerbated in circumstances where the proposed insured is given temporary insurance coverage pending the underwriting and issuing of the insurance policy that was purchased. A need exists for better documentation that is personalized for the insured and clarifies both the insurance policy that was purchased and any temporary coverage provided while the policy is being issued.

The present invention is directed to a method and system that addresses the foregoing needs and deficiencies and provides better processing of life insurance applications online.

SUMMARY OF THE INVENTION

The present invention provides a method and system for providing online processing of life insurance applications. Customers and/or agents having an electronic data communication link with an insurance provider are able to prepare and submit a completed life insurance application.

In one embodiment, a method for online processing of a life insurance application includes receiving information via an electronic data communications link that identifies an individual to be insured and describes the insurability of the individual. This information is included in a life insurance application and provides a basis for generating an illustration that provides details of a proposed life insurance policy that may be issued in accordance with parameters of the life insurance application. The method further includes obtaining a commitment from the customer, as the insurance policy applicant, for purchase of the life insurance policy.

In one aspect, the present invention advantageously provides a process in which an insurance provider may receive a certification via an electronic data communications link confirming whether the generated insurance policy illustration was delivered to the insurance policy applicant. The certification of delivery of the illustration may be received from the insurance policy applicant and/or the agent at the time the applicant commits to purchase the life insurance policy. For example, the applicant may directly certify that an illustration has been received. In another example, an agent of the life insurance provider may certify that the illustration was provided to the applicant, either electronically or by postal or courier delivery. Alternatively, the applicant may certify that no illustration was delivered at the time of commitment for purchase of the policy and request that the illustration be delivered at the time the insurance policy is delivered. In all these cases, the certification is transmitted electronically to the insurance provider.

In another embodiment, a method for online processing of a life insurance application may be configured to issue via an electronic data communications link, a temporary insurance certificate that is personalized for the proposed insured according to information in the life insurance policy that was purchased. The temporary insurance certificate is preferably accompanied by a temporary life insurance agreement specifying the terms of legally-binding temporary life insurance coverage that is extended to the proposed insured pending issuance of the purchased insurance policy. The personalized temporary insurance certificate preferably clarifies the terms of both the temporary life insurance as well as the insurance coverage to be provided by the purchased insurance policy once it is issued. The personalized temporary insurance certificate may include, for example, information identifying the insured individual, the policy to be issued to the individual, and the amount of insurance coverage provided by the temporary life insurance agreement.

A further feature of the present invention is a method in which information is received via an electronic data communications link from a third party that confirms the identification of the individual to be insured. This confirmation of identification is preferably received from a third party that is a trusted person or entity having a capacity to verify the identification of the proposed insured. For example, the trusted person may be an agent of the insurance provider that personally inspects identification documents or investigates the identification of the proposed insured. The third party may also be the proprietor of an electronic database, such as a state agency that governs driver's license numbers, state identification numbers, social security numbers, etc. The agency verifies the identification of the proposed insured based on information in the electronic database.

Yet another embodiment of the present invention provides a method in which an insurance provider receives an authorization via an electronic data communications link that authorizes the insurance provider (or underwriters at its direction) to immediately begin collecting medical history information from one or more third parties concerning the individual to be insured for purposes of issuing the life insurance policy. Preferably, the medical authorization is received from the applicant in connection with a commitment from the applicant to purchase a life insurance policy. An applicant may provide authorization for accessing medical records by initiating an electronic submission to the insurance provider acknowledging the medical authorization given. The medical authorization may also be received from an agent of the insurance provider as a result of the agent receiving authorization from the applicant. The agent submits the life insurance application to the insurance provider via an electronic data communications link.

BRIEF DESCRIPTION OF THE DRAWINGS

The foregoing aspects and many of the attendant advantages of this invention will be more readily appreciated and understood in reference to the following detailed description, when taken in conjunction with the accompanying drawings, wherein:

FIG. 3 is a depiction of a Web page requesting information from a customer for quoting an estimated cost of a universal life insurance policy according to one exemplary embodiment of the invention;

FIG. 6 is a depiction of a Web page continuing the life insurance application shown in FIG. 5;

FIG. 10 is a depiction of a Web page continuing the life insurance application of FIG. 5 with queries concerning health and existing policies covering the proposed insured;

FIG. 15 is a depiction of an exemplary temporary insurance certificate that is personalized for the insured and provided in accordance with the present invention; and FIG. 16 is a depiction of a temporary insurance agreement that is provided in accordance with the present invention.

DETAILED DESCRIPTION OF THE PREFERRED EMBODIMENT

The present invention provides online processing of life insurance applications submitted to an insurance provider via a distributed computing network, such as the Internet. Distributed computing networks are well known in the field of data communications. While the present invention is described herein using electronic data communication via the Internet, persons of ordinary skill in the art will recognize that the invention may be used in other data communication environments that provide electronic data communication links to connect insurance policy applicants to insurance providers for processing life insurance applications.

Figure 1:
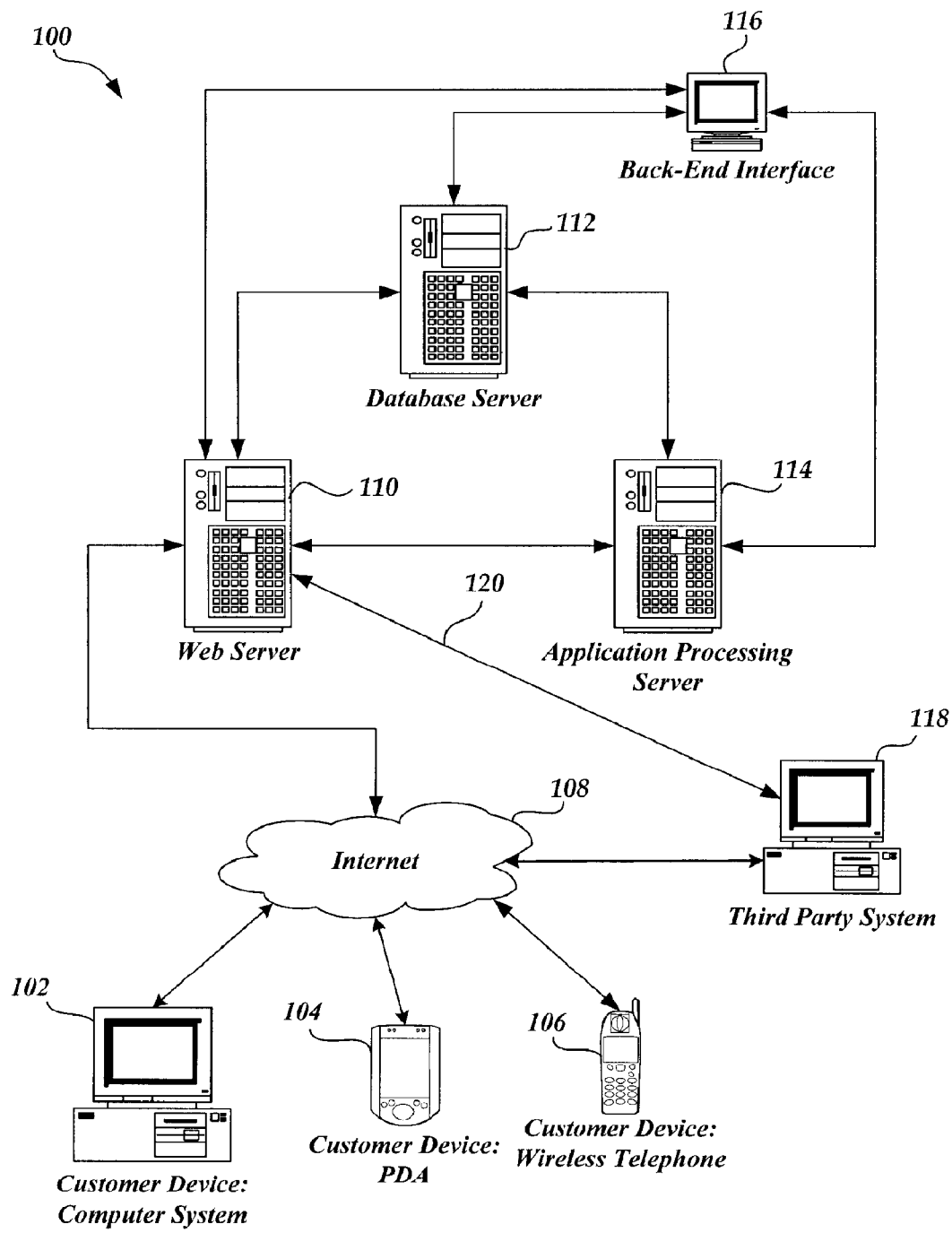
FIG. 1 is a pictorial diagram of an environment for implementing one exemplary embodiment of the invention.

Prior to discussing features and aspects of processing provided by the present invention, a description of a computing environment for implementing the invention is provided. FIG. 1 illustrates a pictorial diagram of one suitable environment for implementing an embodiment of the present invention. The environment shown in FIG. 1 includes an insurance provider system 100 comprised of servers 110, 112, 114 and a back-end interface 116. The environment also includes exemplary customer devices, such as a computer system 102, a PDA 104, and a wireless telephone 106. Each of the customer devices 102, 104, 106 is configured for communication with the insurance provider system 100. In the environment shown in FIG. 1, the customer devices 102, 104, 106 communicate with the insurance provider system 100 via the Internet, depicted by a cloud 108. Additionally, as described further below, a third-party system 118 may communicate with the insurance provider system 100 via the Internet 108 or a private data communication link 120. Protocols and components for communicating via the Internet and/or private data communication links are well known to those of ordinary skill in the art of computer communications.

The insurance provider system 100 depicted in FIG. 1 is shown operating in a distributed computing environment comprising several computer servers that are interconnected using one or more data communication links. However, those having ordinary skill in the art will recognize and appreciate that the system 100 could equally operate in a computing environment having fewer or greater number of components than are illustrated in FIG. 1. Thus, the depiction of the insurance provider system 100 in FIG. 1 should be taken as exemplary, and not limiting to the invention.

The insurance provider system 100 includes a Web server 110, a database server 112, and an application processing server 114. Each of these servers 110, 112, and 114, which will be described below in more detail, may be connected to a back-end interface 116 that allows the insurance provider to monitor and adjust the operation of the servers.

In brief, the Web server 110 is generally responsible for providing front-end communication between the insurance provider and customers using customer devices, such as devices 102, 104, 106. The front-end communication may include generating text and/or graphics, possibly organized as a Web page using a markup language and hypertext transfer protocol, in response to inquiries and information received from customers.

The Web server 110 may obtain information on insurance products and services available from the insurance provider directly from the database server 112 for presentation to customers. The Web server 110 may also communicate information to and from the application processing server 114 and relay those communications, as appropriate, to the customers. If needed, the application processing server 114 may communicate with the database server 112, for instance, to obtain electronic life insurance application forms to be used in connection with a customer interaction.

The database server 112, in this embodiment, is generally responsible for maintaining a comprehensive catalogue of the insurance products and services that the insurance provider is making available to its customers. This catalogue may be maintained in a conventional database stored in one or more memory storage devices within the database server 112. The database server 112 may also maintain a database that contains life insurance application forms for use by the application processing server 114, if needed.

The application processing server 114 is generally charged with the task of providing information and queries to the Web server 110 for forwarding to the customer, and receiving information from the customer via the Web server 110 for processing and completing a life insurance application. The processing performed by the application processing server 114 may include one or more of the following actions: (1) confirming the identification of a proposed insured through communication with a third party; (2) obtaining electronic authorization from a customer to begin collecting medical history information; (3) obtaining an electronic certification indicating whether an illustration of the insurance policy was given to the customer; and (4) delivering a personalized temporary insurance certificate, with an accompanying temporary insurance agreement, to the customer once a commitment to purchase the insurance policy is received. These features, and other advantages provided by the present invention, will become more evident from the description below.

Figure 2:
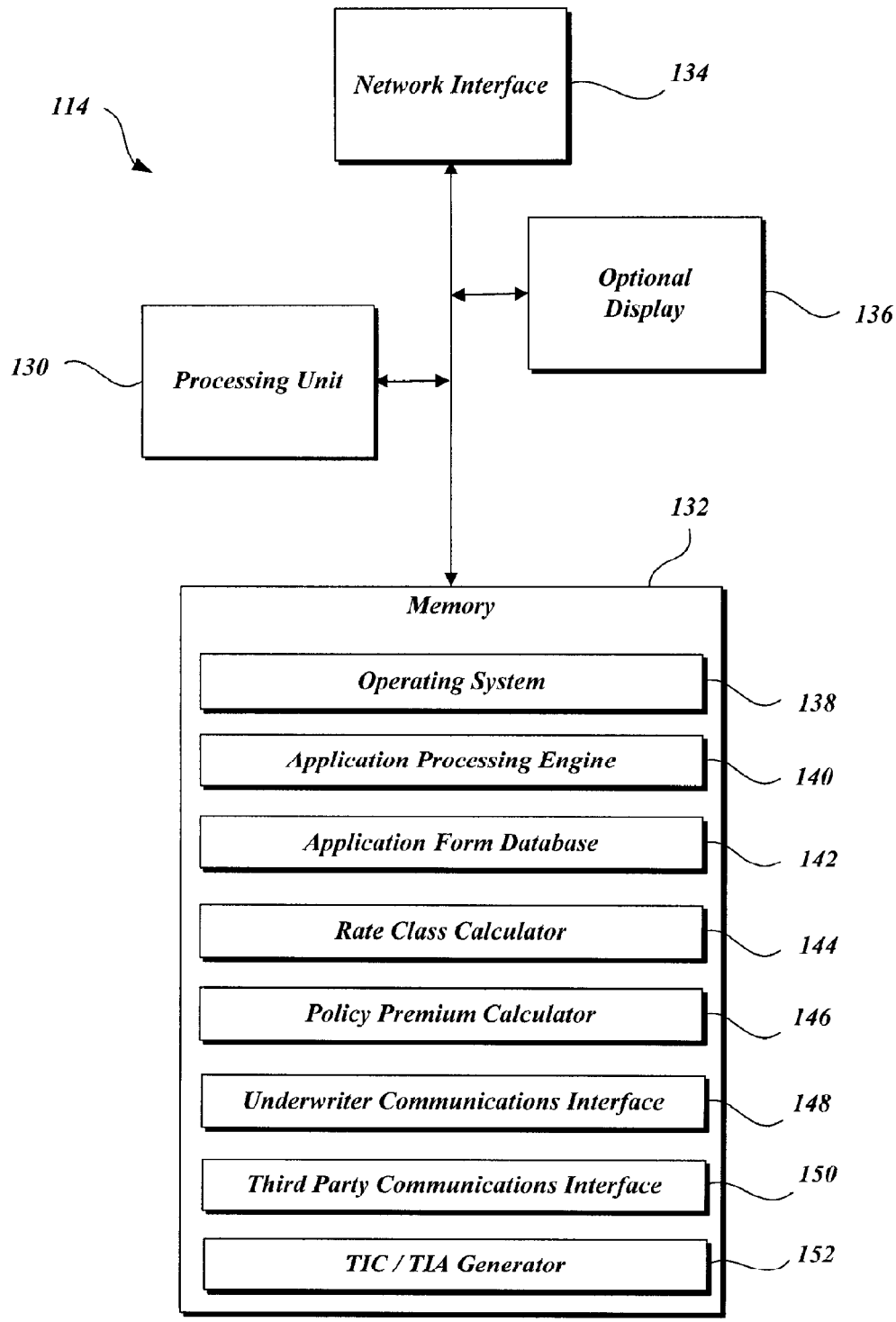
FIG. 2 is a block diagram depicting an arrangement of certain computer hardware and software for implementing an application processing server shown in FIG. 1.

Before discussing details of the processing performed by embodiments of the application processing server 114, the following discussion provides a brief description of one exemplary arrangement of an application processing server 114. Turning to FIG. 2, an embodiment of the application processing server 114 may include a processing unit 130, a memory 132, a network interface 134, and an optional display 136, all of which can communicate with each another by way of a communication bus. Similar design arrangements may be provided for the Web server 110 and database server 112. The network interface 134 is preferably connected to one or more computer networks or data communication links that connect to the other components in the insurance provider system 100. The processing unit 130 may thus receive information and instructions from the other computing components, such as the Web server 110 and the database server 112, via the network interface 134. The processing unit 130 may also communicate information to and from the memory 132, and further provide output information, either directly to the display 136 or to other computing components such as the Web server 110 and the database server 112 via the network interface 134. Other components not shown, such as a user input device, may also be included in the program server 114.

The memory 132 contains, among other things, computer program instructions that the processing unit 130 executes in order to operate the application processing server 114. Similarly, a memory in each of the Web server 110 and database server 112 contains computer programs instructions that are executed by processing units in those servers to operate the respective servers. In the embodiment shown in FIG. 2, the memory 132 includes an operating system 138 that provides executable program instructions for the general administration and operation of the application processing server 114. The memory 132 further includes executable computer program instructions for implementing features of the invention including program instructions that form an application processing engine 140, an application form database 142, a rate class calculator 144, a policy premium calculator 146, an underwriter communications interface 148, a third party communications interface 150, and a temporary insurance certificate (TIC) and temporary insurance agreement (TIA) generator 152.

To better understand the operation of each of the features shown in the memory 132 in FIG. 2, a series of computer display screens are provided in FIGS. 3-14 which illustrate customer interaction with an insurance provider for quoting, illustrating, and applying for life insurance in accordance with one embodiment of the invention. These figures, in particular, depict an application process for universal life insurance, but it should be well understood that the present invention applies to other forms of life insurance, including term life insurance and simplified issue term life insurance, as well as other forms of universal life, variable universal life, and whole life insurance. Computer program instructions stored and executed by one or more of the servers in the insurance provider system 100 implement the invention and produce, in this example, the screen displays depicted in FIGS. 3-14. FIGS. 15 and 16, discussed below, provide examples of a personalized temporary insurance certificate and temporary insurance agreement provided in accordance with the present invention.

Referring now to FIG. 3, a customer or agent utilizing a Web browser program 160 may access a Web site provided by an insurance provider, such as the fictitious XYZLife Insurance Company that is used in this example. A customer or agent accessing an insurance provider Web site is preferably provided opportunities to obtain a quote, receive an insurance illustration, and submit a completed life insurance application. It should be understood that the processing provided by the present invention facilitates interaction between an agent and a customer in both face-to-face and remote sales arrangements. Accordingly, the person accessing the insurance provider's Web site in this example may be a customer or agent, or both, as needed. For simplicity of description, however, the description herein is generally described in the context of a customer accessing the insurance provider's Web site.

In FIG. 3, the customer's Web browser program 160 presents a screen display 162 for obtaining a universal life insurance quote. The screen display 162 requests basic information 164 that the customer fills in to provide a basis for the insurance provider to calculate a quote. This basic customer information 164 may include, for example, the amount of the insurance policy, the state in which the proposed insured lives, and the gender and age of the proposed insured. Furthermore, as indicated at reference numeral 166, the screen display 162 may ask the customer to indicate the rate class for which the proposed insured may qualify. To assist in this determination, the insurance provider may provide a link 168 to a rate class calculator 144 (FIG. 2) that identifies an appropriate rate class for the proposed insured based on the information provided by the customer. Before determining an appropriate rate class, the rate class calculator 144 may ensure that valid inputs have been provided for the insurance amount, gender, and age fields. If no insurance amount has been provided at the time the link 168 is clicked, the amount may default to a default amount, such as $500,000. The rate class calculator may be launched in a separate child browser window. Rate classes may be categorized by smokers and nonsmokers, and in each category use one or more subclassifications in a descending order, such as preferred best, preferred plus, preferred, and standard.

The insurance provider may also permit the customer to use one or more links, such as link 170, to indicate an additional rider for term insurance, if desired. Of course, the screen display 162 is exemplary only. Actual insurance quotation services provided by life insurance providers may request more or less information than that which is shown in FIG. 3. After a customer provides the information requested, the customer clicks on a button 172 to obtain a quote for a proposed policy.

Figure 4:
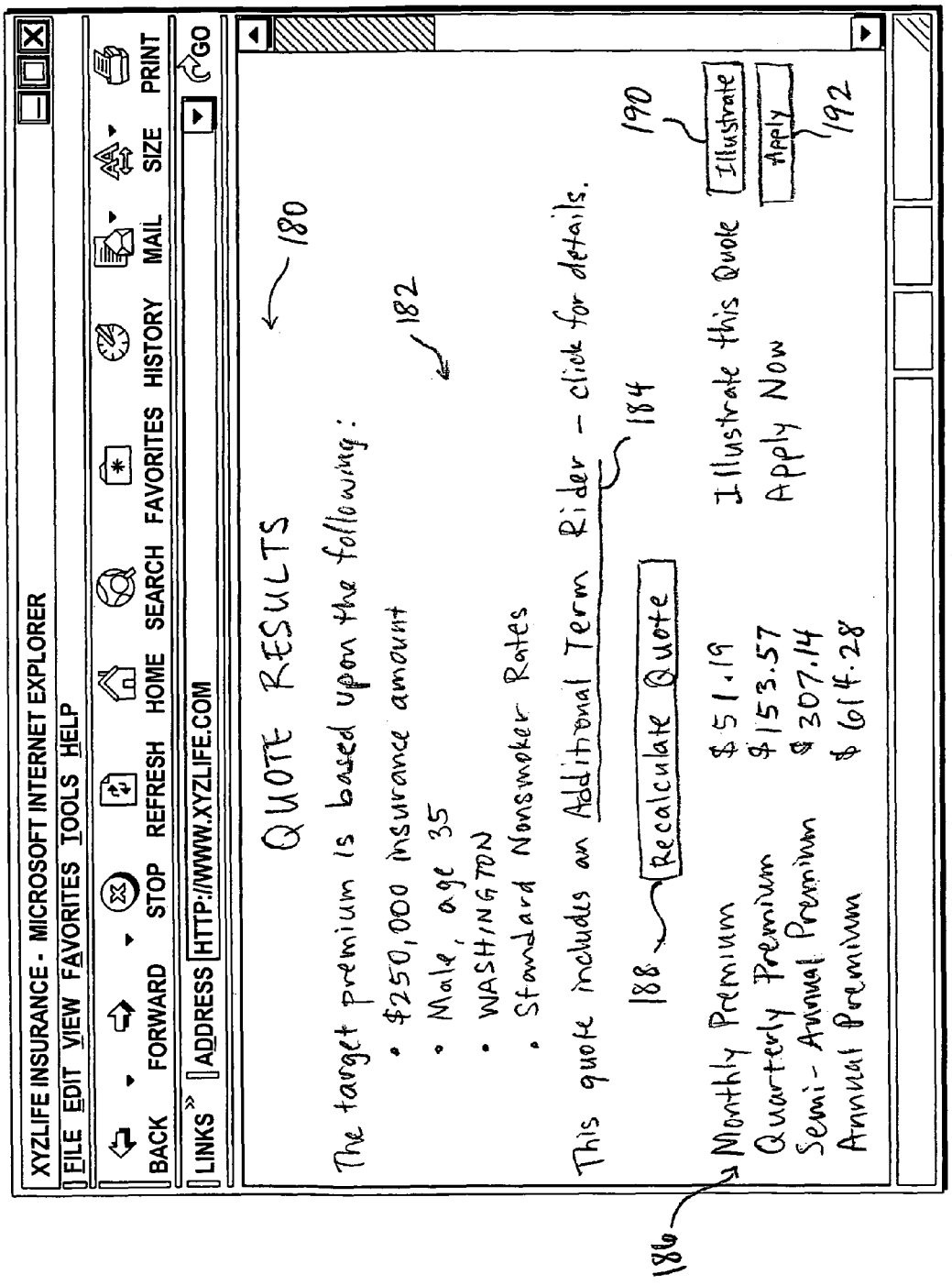
FIG. 4 is a depiction of a Web page presenting a sample quote resulting from the queries shown in FIG. 3.

In response to the customer's quote request, the insurance provider may employ a policy premium calculator 146 (FIG. 2) to assess the information provided and calculate an appropriate quote for the customer. The quote may be an estimate only and may or may not be binding on the insurance provider. FIG. 4 illustrates a screen display 180 providing the results of an insurance quote for a customer. The insurance quote, as shown, may include a brief summary 182 indicating the basis for the premium that is quoted. If, for example, the customer has requested an additional term rider, a link 184 may be provided to the customer to review and/or modify the selection of this additional rider. The insurance provider may provide estimated costs for insurance based on a monthly, quarterly, semi-annual, or annual premium, or other desired payment schedule, as indicated at reference numeral 186. Should the customer desire to change one or more parameters of the quote, the customer may click on button 188 to modify the quote request and recalculate the quote.

Figure 11:
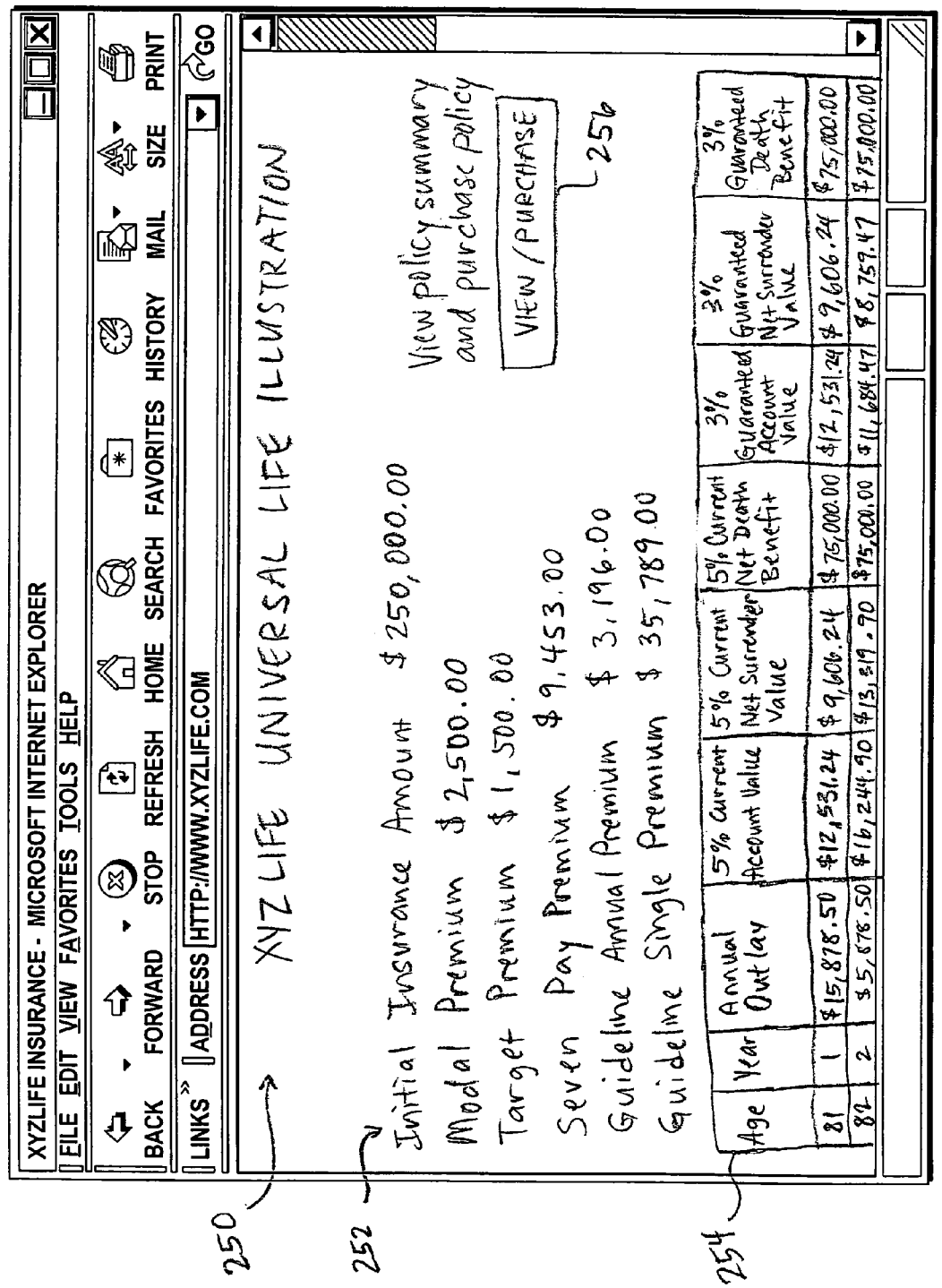
FIG. 11 is a depiction of a Web page presenting an illustration of a universal life insurance policy provided in accordance with one exemplary embodiment of the invention.

If the customer is satisfied with the quote and desires to view an illustration of a proposed insurance policy, the customer may click on the button 190 to receive an illustration. As will be described below, FIG. 11 depicts one example of an illustration for a universal life insurance policy. The customer may also proceed to apply for the proposed insurance policy using the application processing engine 140 (FIG. 2) by clicking on the apply button 192.

Figure 5:
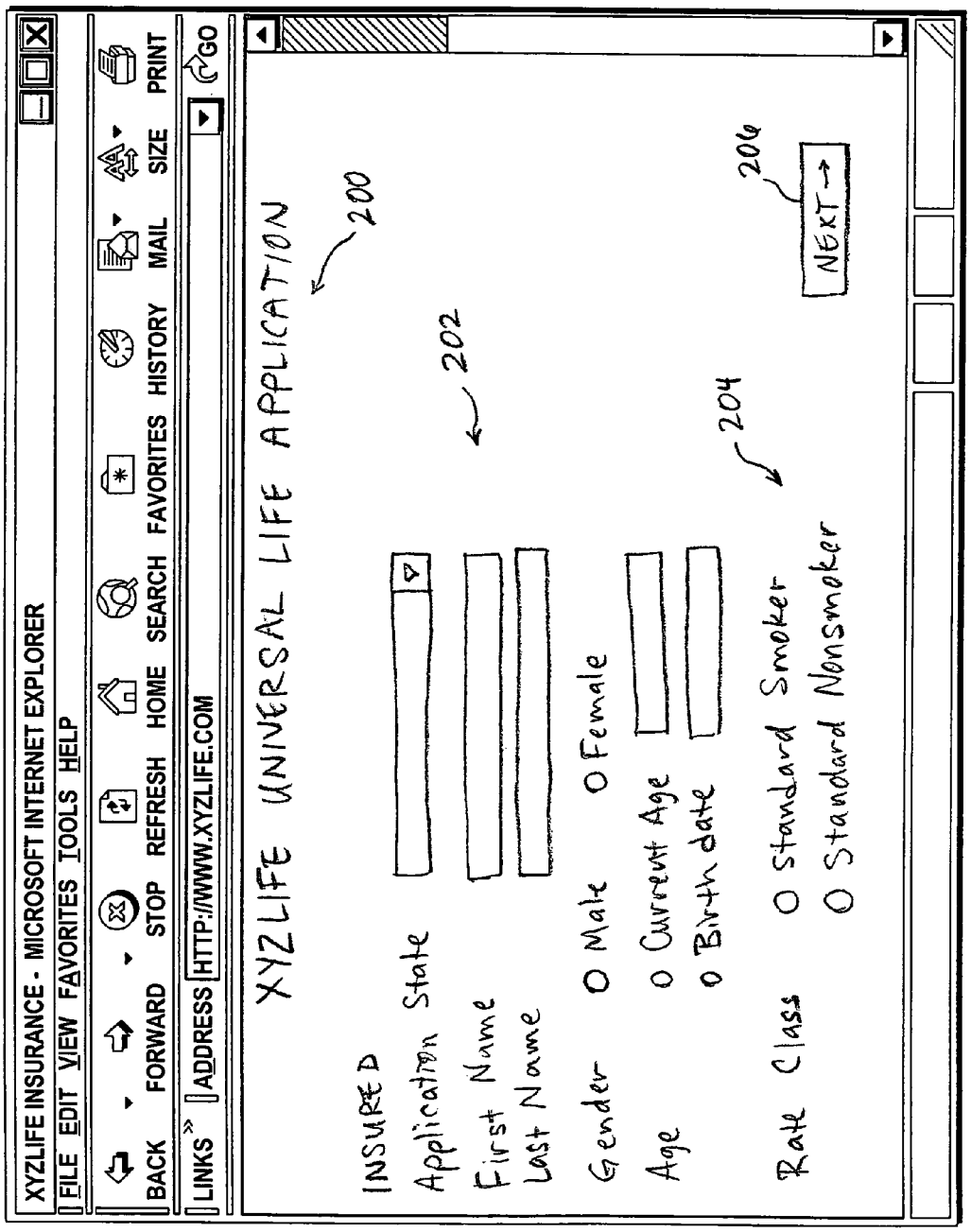
FIG. 5 is a depiction of a Web page presenting the beginning of a universal life insurance application that includes queries for information concerning the insurability of an individual according to one exemplary embodiment of the invention.

When the customer decides to proceed to apply for a life insurance policy, the customer may receive a screen display 200 as shown in FIG. 5. FIG. 5 depicts a Web page presenting the beginning of a universal life insurance application that includes queries for information from the customer concerning the insurability of the individual to be insured. The insurance application may be retrieved from an application form database 142 in the application processing server 114, or from the database server 112. As would be expected, the life insurance application requests basic information 202, such as the name of the proposed insured, the state in which the proposed insured lives, and the gender and age of the proposed insured. If the customer has previously obtained an insurance quotation as depicted in FIGS. 3 and 4, or an illustration as depicted in FIG. 11, for example, the insurance provider system 100 may automatically insert the basic information 202 based on the information received in the quotation process. Automatic insertion of information from the quotation illustration process may also be used in the rate class query 204, as illustrated in FIG. 5, as well as for information requested in other screen displays, such as screen displays 208 and 222 in FIGS. 6 and 7. To navigate through the life insurance application, the application processing engine 140 (FIG. 2) may provide one or more buttons to the customer, such as a "Next" button 206.

Figure 6:
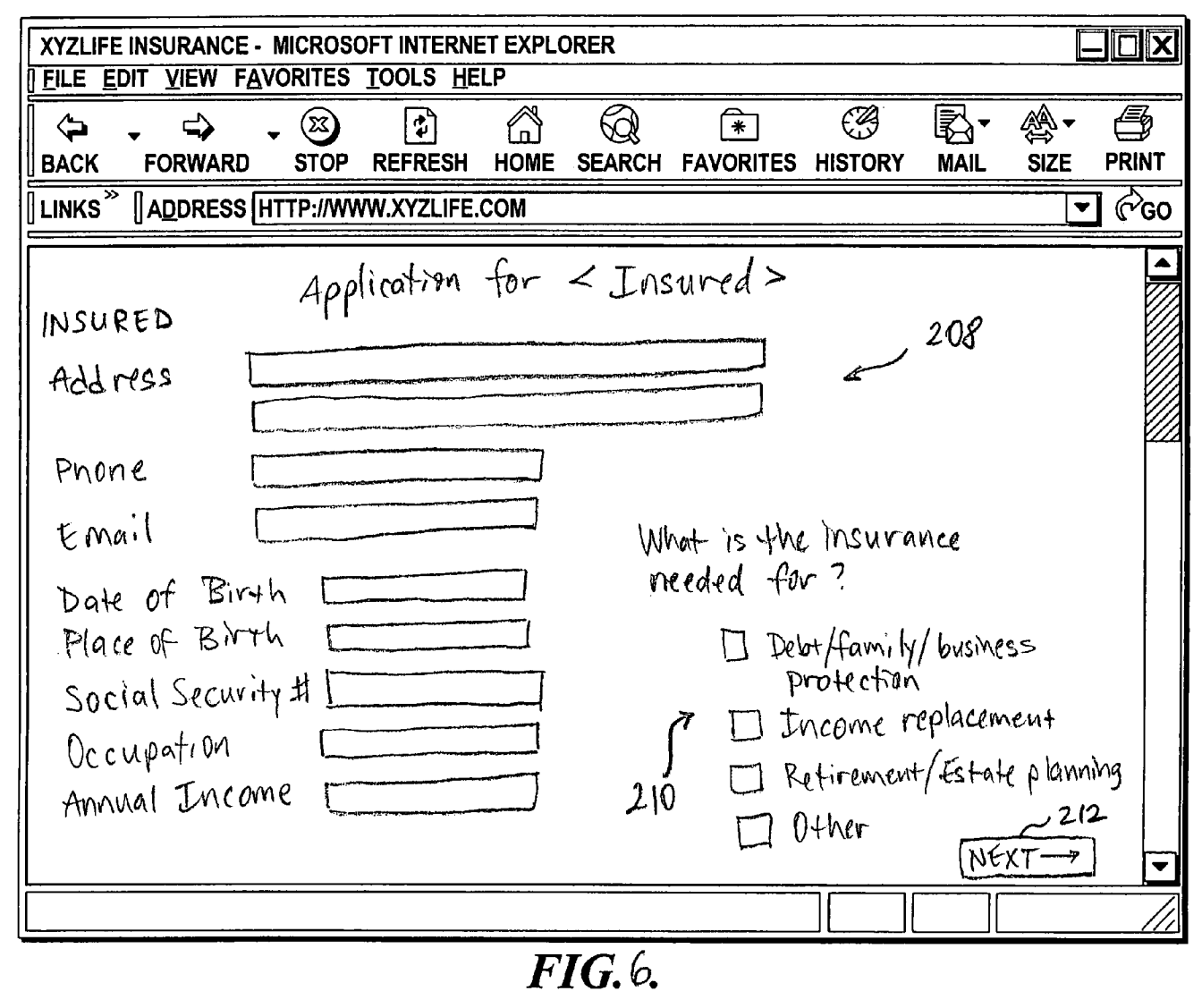

Upon clicking the "Next" button 206, a screen display 208 shown in FIG. 6 may be presented to the customer. From this point on, the application process may be personalized for the proposed insured using the title of the screen display where it indicates "Application for <Insured>" (where the name of the proposed insured is inserted). Additional basic information about the proposed insured, including address, phone number, e-mail, date and place of birth, social security number, occupation, annual income, and other information may be requested. An insurance provider may also seek information concerning the purpose of the insurance policy. As indicated at reference numeral 210, the customer may indicate that the insurance is needed for debt/family/business protection, income replacement, retirement/estate planning, or other needs.

Figure 7:
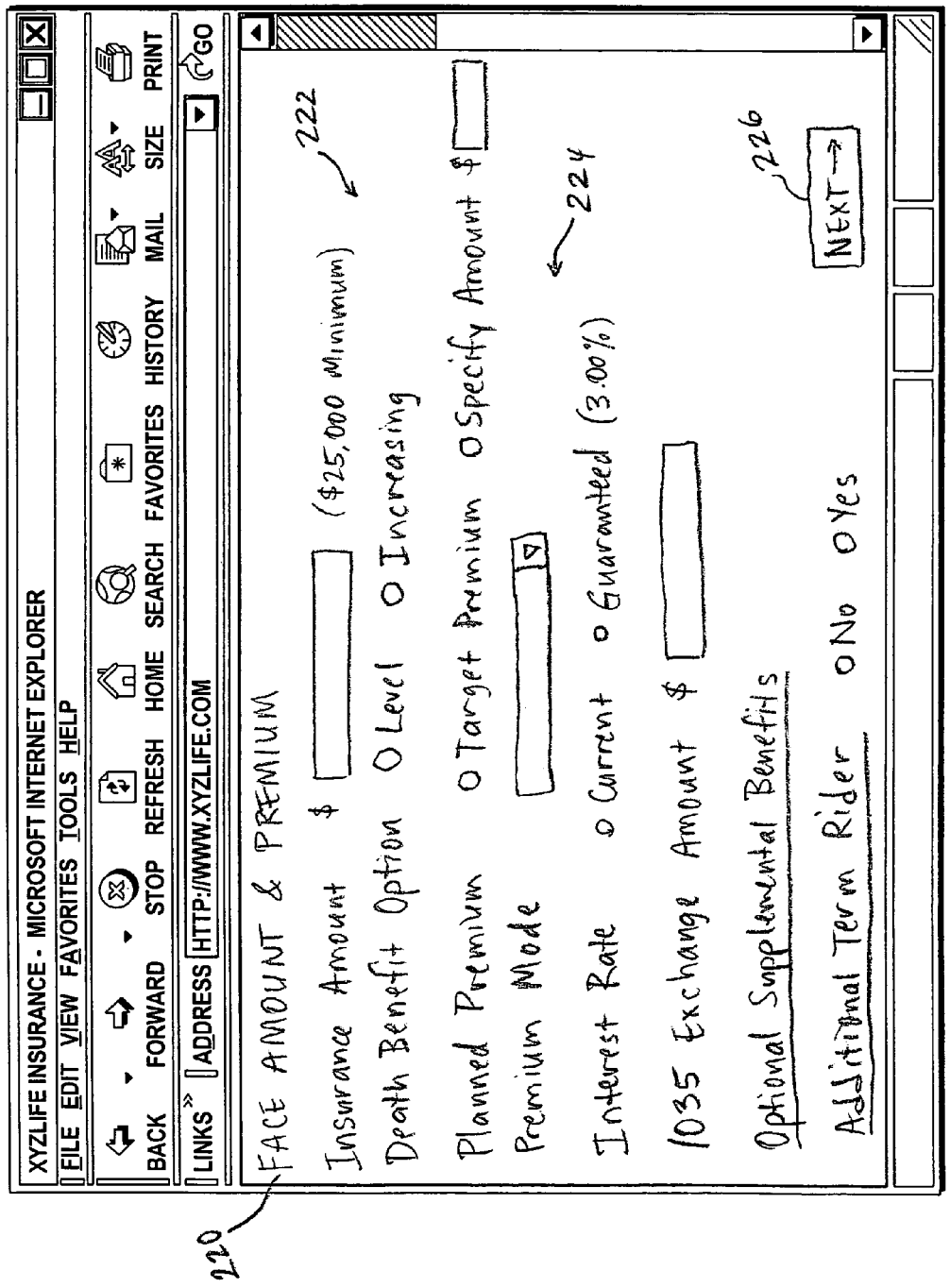
FIG. 7 is a depiction of a Web page continuing the life insurance application of FIG. 5 with queries concerning the face amount and premium of the prospective policy.

Upon clicking the "Next" button 212, the customer may be presented a screen display 222 as shown in FIG. 7. The screen display 222, in this example, queries the customer for information concerning the face amount and premium 220 of the desired insurance policy. Data entry fields may be provided for items 224, such as the insurance amount, death benefit options, planned premium, premium mode, interest rate, 1035 exchange amount, and other information as needed. Again, as noted earlier, this particular example of an insurance application process according to the invention is not intended to be comprehensive in describing all aspects of an actual life insurance application, but instead, provides sufficient background information for describing the features of the present invention.

Figure 8:
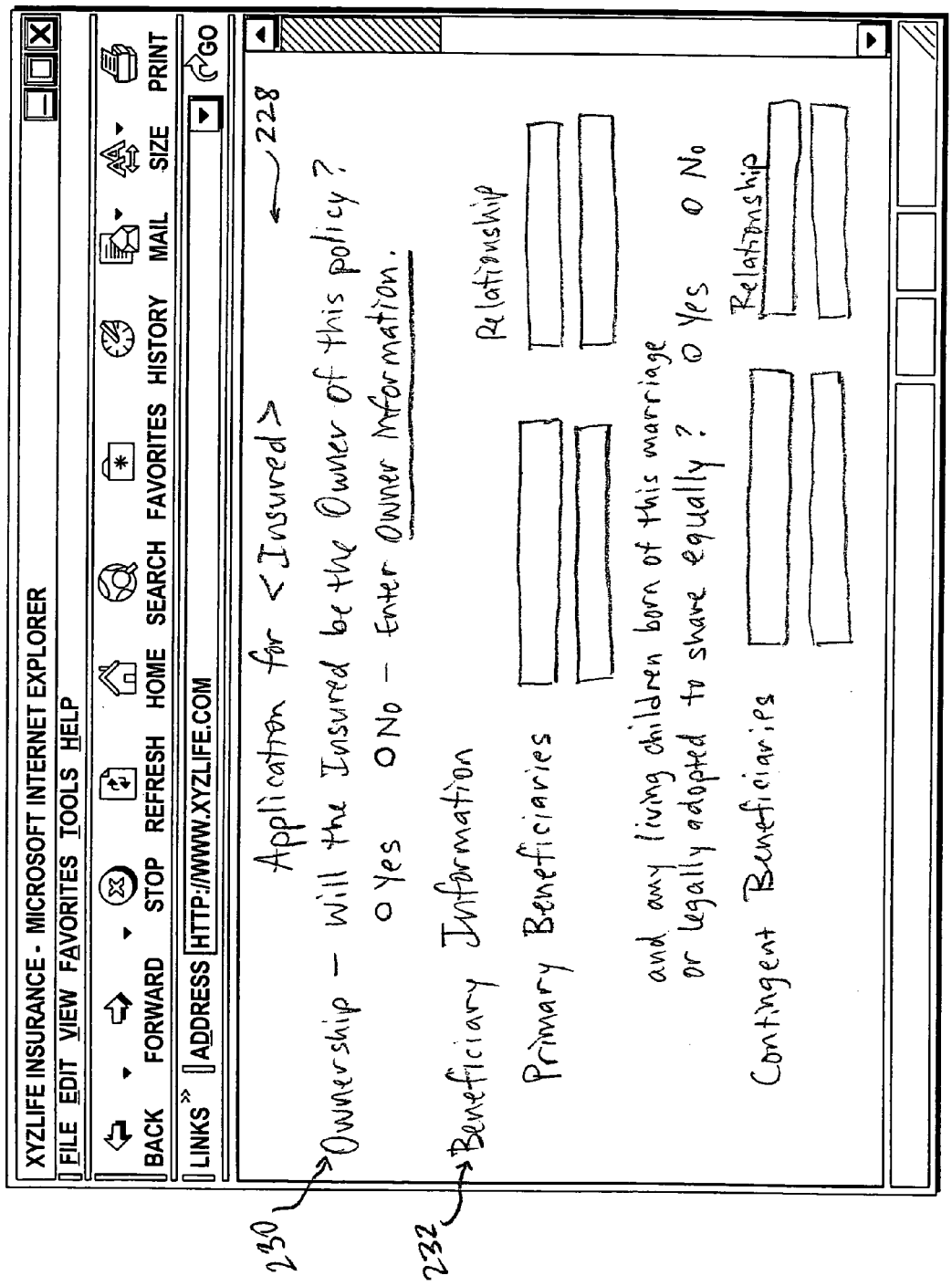
FIG. 8 is a depiction of a Web page continuing the life insurance application of FIG. 5 with queries concerning ownership and beneficiaries of the prospective policy.

Upon clicking the "Next" button 226, the customer may receive a screen display 228 as shown in FIG. 8. The screen display 228 requests information concerning ownership 230 and beneficiary information 232, as shown. These and other aspects of the insurance application process may apply to other forms of life insurance, as is well known in the life insurance industry. Furthermore, the Web page shown in FIG. 8, as with the other Web pages shown herein, may be longer than the screen display as shown. In this example, additional information inquiries concerning contingent beneficiaries may continue as the customer scrolls down the screen display 228. In keeping with the other screen displays of this example, the bottom of the Web page in FIG. 8 preferably includes a "Next" button on which the customer clicks to proceed in the application process.

Figure 9:
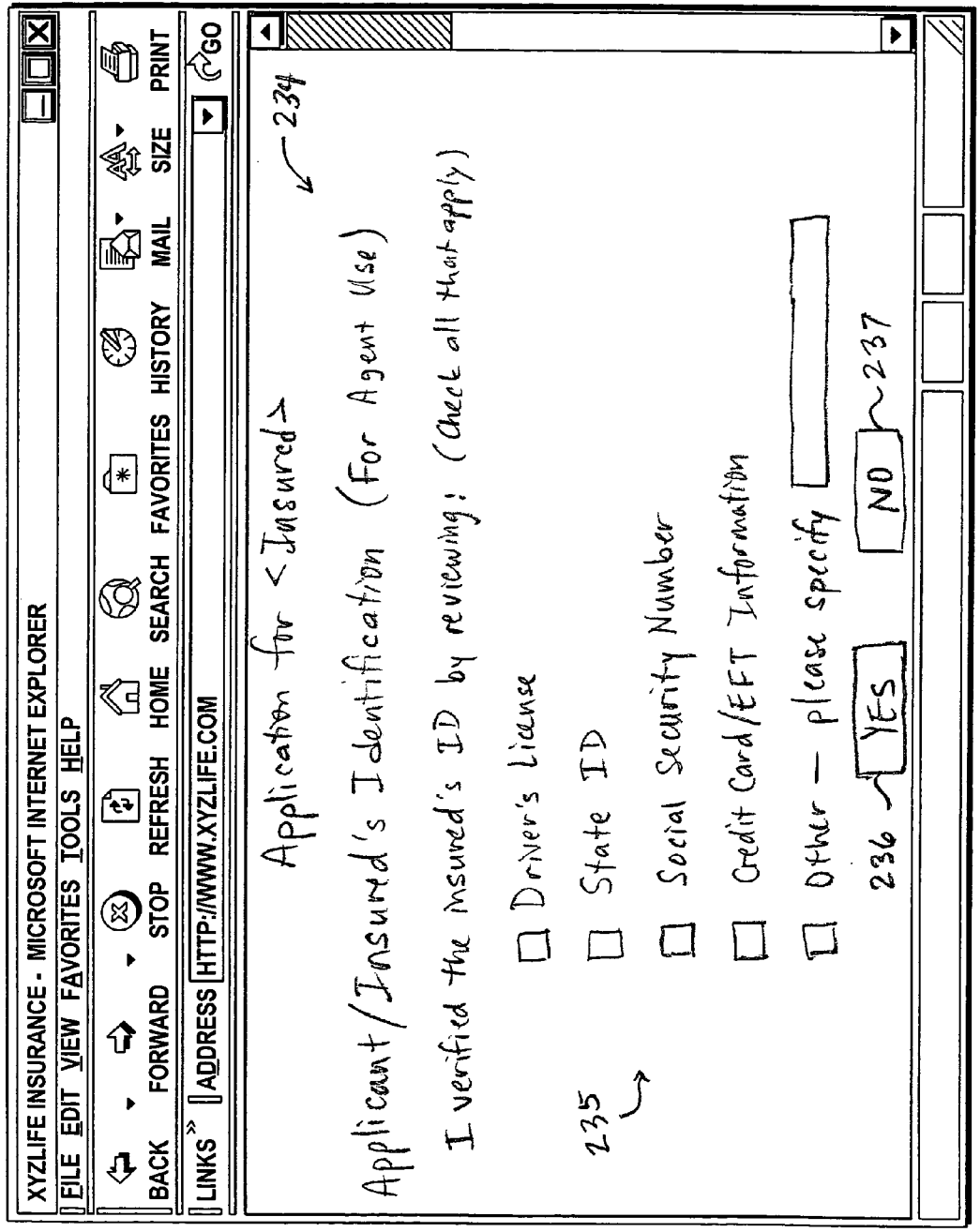
FIG. 9 is a depiction of a Web page continuing the life insurance application of FIG. 5 in which the identity of the applicant/insured is confirmed.

One of the features of the present invention is a process for receiving information via an electronic data communications link from a third party that confirms the identification of the individual to be insured. The third party providing the confirmation should be a trusted person or entity having a capacity to confirm the identification of the individual. For example, a trusted person may be an agent of the insurance provider. In circumstances where the agent is actively participating in the preparation and submission of an online insurance application, as described herein, the agent may receive a screen display 234 as shown in FIG. 9. The screen display 234 enables the agent to verify that he or she has reviewed the insured's identification by inspecting one or more forms of identification 235 for the proposed insured. Such identification may include, but is not limited to, a driver's license, a state-issued identification, a social security number, credit card or electronic funds transfer information, etc. If the agent is able to confirm the insured's identity, the agent clicks on the "Yes" button 236. Otherwise, the agent clicks on the "No" button 237.

Automated confirmation of an insured's identification may also be provided in accordance with the present invention. For automated confirmation, the application processing server 114 receives an indication from the customer of the proposed insured's identification, e.g., a driver's license number, state I.D. number, social security number, credit card number, etc. The application processing server 114 then uses the third-party communications interface 150 (FIG. 2) to communicate with a third-party system 118 (FIG. 1) to confirm the identity of the proposed insured. The third-party communications interface 150 may communicate with the third-party system 118 via the Internet 108 or a designated private communication link 120. The third-party system 118, in this case, may be an agency that administers an electronic database containing, for example, driver's license numbers or state identification numbers. In response to a request from the application processing server 114, the agency accesses the electronic database and verifies the identification of the individual based on information in the electronic database. This verification is then returned to the application processing server 114 to confirm the proposed insured's identity. In another example, the third-party system 118 may be operated by a financial institution, such as a bank, or a credit reporting agency, which confirms the identity of a proposed insured based on financial, social security or credit information. Where an automated electronic confirmation of identify is obtained from a third party, the screen display 234 shown in FIG. 9 may not be necessary.

Continuing now to FIG. 10, a screen display 238 may be presented to the customer requesting health and existing policy information 240. The health of the proposed insured may affect whether the insurance company is willing to extend temporary life insurance to the proposed insured while the life insurance policy is being issued. In regard to temporary insurance coverage, the screen display 238 in this example queries the customer regarding hospitalization 242 and health information 244, as shown. If the proposed insured has been hospitalized in the past 90 days, or if the proposed insured has been treated by a medical professional for certain conditions, the life insurance provider may refuse to collect a premium at the time of application and not extend temporary insurance coverage to the proposed insured, as indicated at reference numeral 246. If both of the questions 242 and 244 are answered "No," and if the requested amount of insurance does not exceed a stated amount, the premium for the life insurance policy may be collected and temporary insurance coverage extended to the proposed insured. To inform the customer concerning the features and limitations of the temporary life insurance coverage, a link 248 to the temporary life insurance agreement (FIG. 16) may be provided. As the customer scrolls down through the Web page in FIG. 10, the remainder of the Web page may inquire about existing life insurance policies presently covering the proposed insured and whether a policy issued on the current insurance application is intended to replace one or more of the insured's existing policies.

As part of the life insurance application process, the customer may receive an illustration of a life insurance policy prepared in accordance with parameters of the life insurance application. Life insurance illustrations are standard aspects of an insurance application process. The contents of a full illustration may vary depending on state insurance regulations. A sample illustration 250 shown in FIG. 11 includes information 252 showing an initial insurance amount, modal premium, target premium, seven-pay premium, guideline annual premium, and guideline single premium options, for example, that are offered to the customer. The premiums may be calculated using the policy premium calculator 146 (FIG. 2) and are usually binding on the insurance provider should the insurance policy illustrated be issued. The illustration may also include a table 254 that sets forth the financial values of items, such as the annual outlay, account values, surrender values, death benefits, etc., of the proposed insurance over the years in which the policy may be in effect. The illustration thus provides detailed information to the customer for purposes of evaluating the policy and ensuring that the policy meets the customer's needs. If the customer desires to proceed with the life insurance application, the customer may click on a button 256 to view a summary of the policy and purchase the policy.

Figure 12:
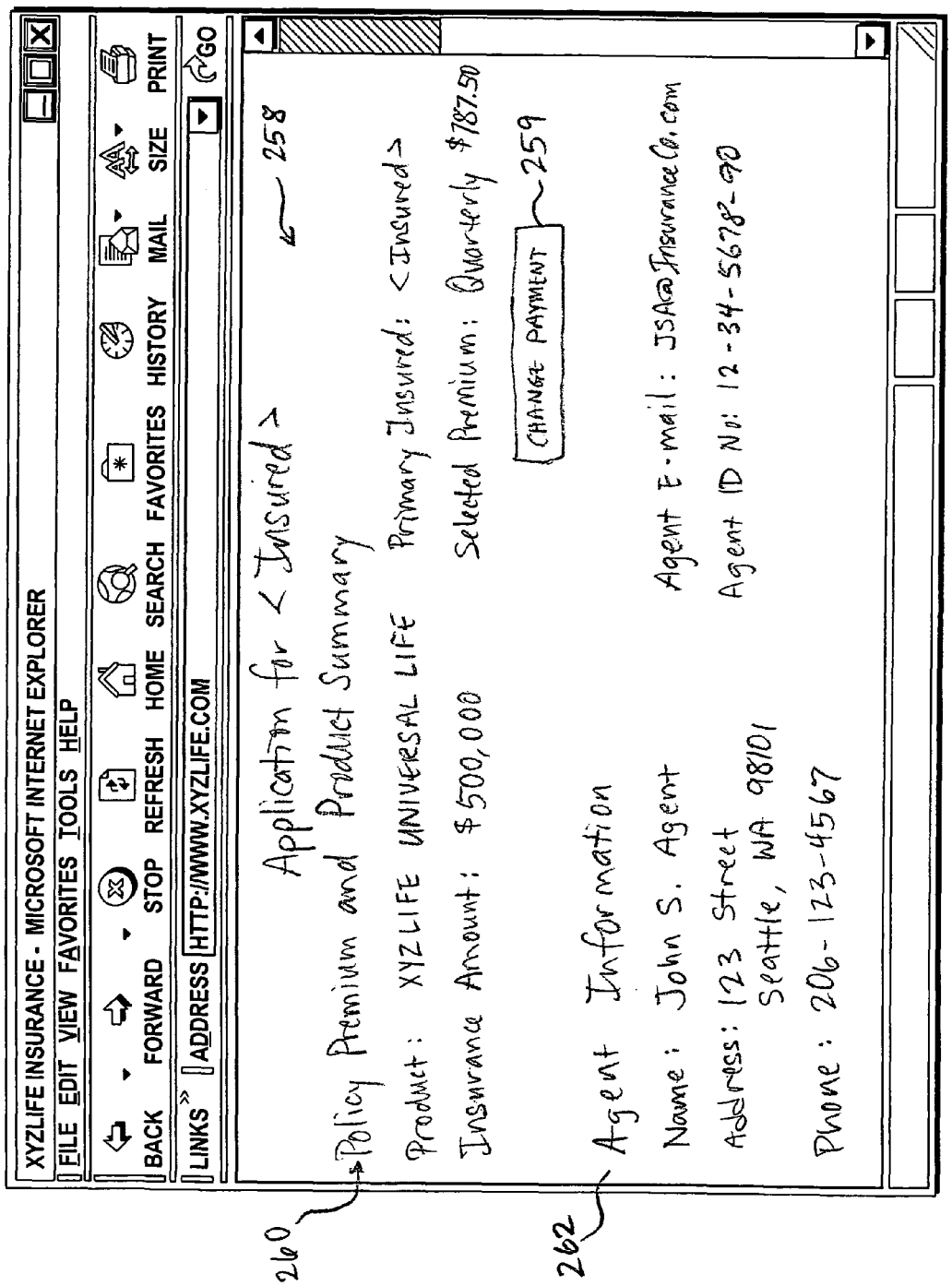
FIG. 12 is a depiction of a Web page continuing the life insurance application of FIG. 5 with information concerning the policy premium and product summary.

FIG. 12 depicts a screen display 258 with a policy premium and product summary 260 for the customer, possibly with a link or button 259 as shown, permitting the customer to change the payment schedule for the premium. Also depicted for the customer's benefit is agent information 262 identifying the particular agent responsible for the sale of the policy.

Figure 13:
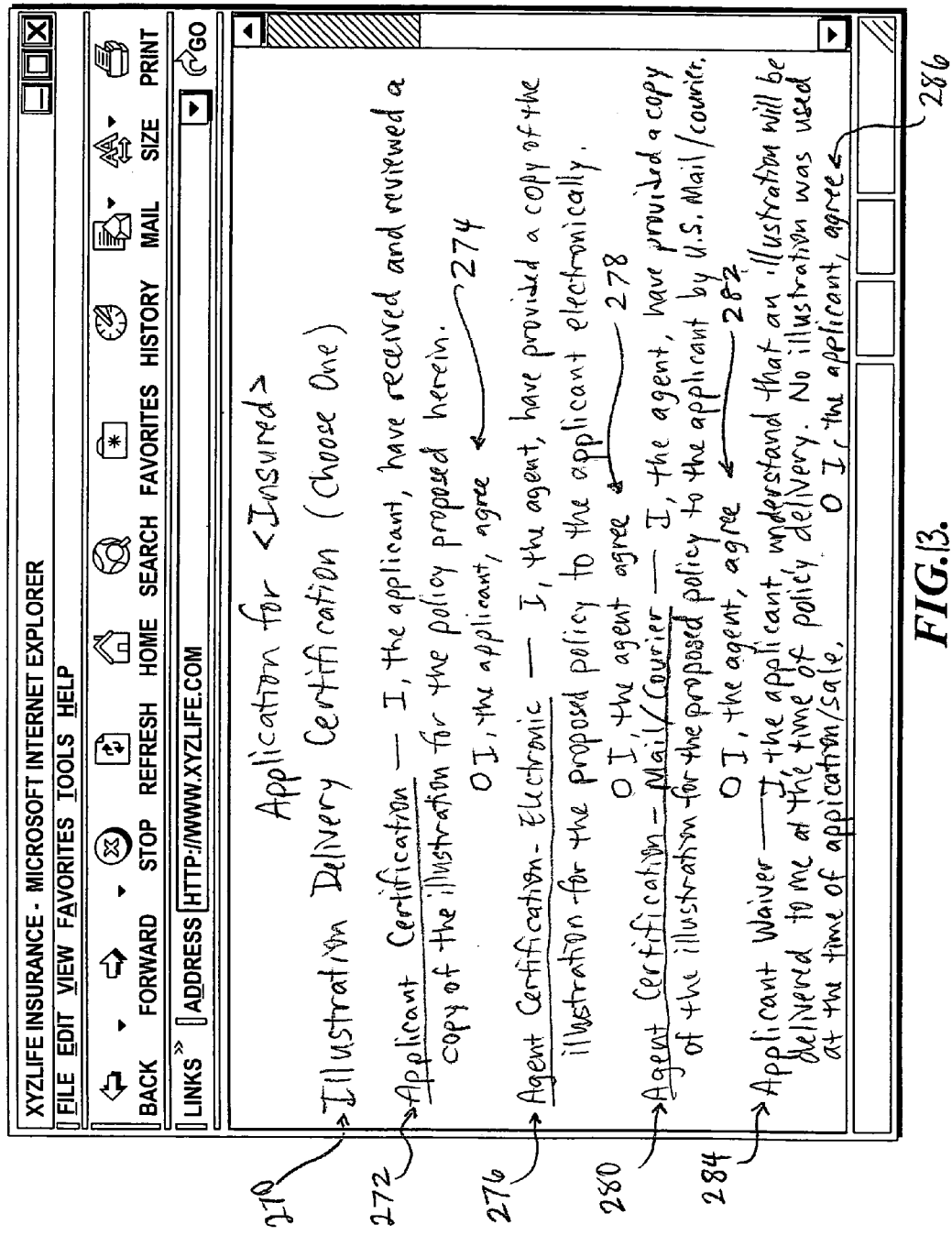
FIG. 13 is a depiction of a Web page requesting certification of delivery of an illustration, such as shown in FIG. 11, to the insurance policy applicant.

Another feature of the present invention is an electronic certification that the insurance provider may receive via an electronic data communications link indicating whether the customer, as the insurance policy applicant, has received an illustration of the insurance policy to be provided. This feature of the invention is intended to support external requirements, such as those of the National Association of Insurance Commissioners (NAIC), that are placed on insurance providers for delivering insurance policy illustrations to customers. FIG. 13 depicts one example of an illustration delivery certification 270 that includes four options. The first option is an applicant's certification 272 in which the customer confirms he or she has received and reviewed a copy of the illustration for the policy that the customer is committing to purchase. Preferably, this option is available only if the customer is in direct contact with an insurance agent and is participating in the online application process with the agent. If the applicant is capable of agreeing to the certification 272, the button 274 is selected. A second option to certify delivery of an illustration is an agent certification 276.

The agent certification 276, in this example, indicates that the agent has electronically delivered a copy of the illustration for the proposed insurance policy to the customer. An agent may make this certification, for example, if the agent and the customer are communicating via e-mail or instant messaging in which a copy of the illustration is transmitted electronically to the customer. Preferably, the illustration is provided to the customer at the time the customer is committing to purchase the policy. If the agent is capable of making the certification 276, the agent selects the button 278.

A third option for certifying the delivery of an illustration is an agent certification 280. In the agent certification 280, the agent certifies that a copy of the illustration for the proposed insurance policy has been provided to the customer via postal or courier service. For example, the postal service may be the U.S. Mail. If the agent is capable of making the certification 280, the agent selects the button 282.

Figure 14:
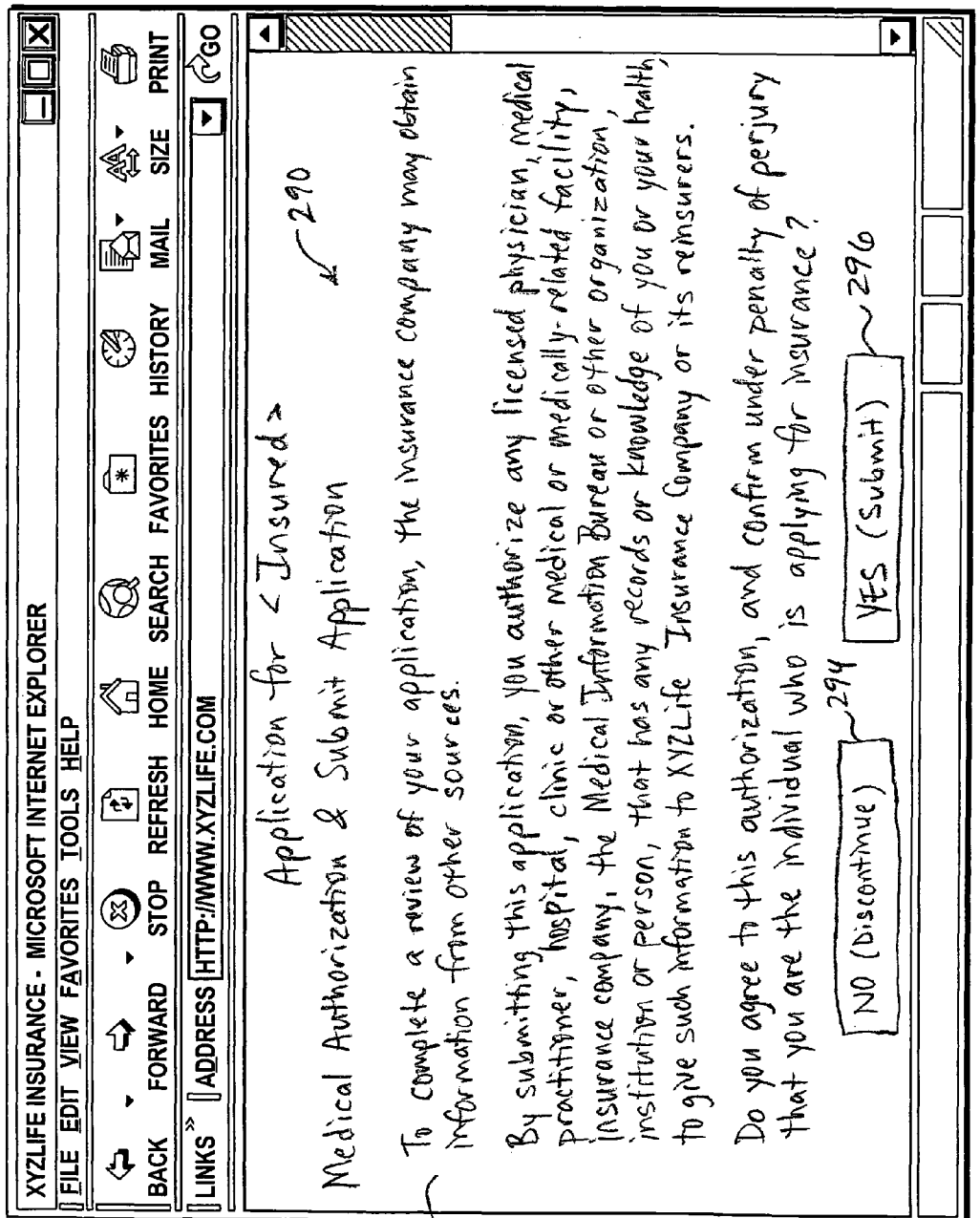
FIG. 14 is a depiction of a Web page continuing the life insurance application of FIG. 5 with a request for authorization to obtain medical records and submit the insurance application to the insurance provider.

Finally, a fourth option is an applicant waiver 284 in which the customer, as the insurance policy applicant, indicates that he or she understands that an illustration will be delivered at the time the policy is delivered, and further that no illustration was used or delivered to the customer at the time of the application or sale of the policy. If the customer agrees to the waiver 284, the customer (or the agent on behalf of the customer) selects the button 286. It is expected that the Web page depicted in FIG. 13 includes a user interface option for submitting the illustration delivery certification to the insurance provider, e.g., by clicking on a "Submit" button later in the process as shown in FIG. 14 or a button that can be viewed by scrolling down the screen display shown in FIG. 13. The certification of delivery of the illustration is electronically received by the insurance provider, thus assuring the insurance provider in an expedited manner that the illustration delivery requirements have been met.

Preferably, certification of delivery of the illustration is received by the life insurance provider at the time the insurance provider obtains a commitment from the customer for purchase of the life insurance policy. The certification may be received prior or subsequent to the customer's purchase commitment. As noted below, the customer's commitment to purchase a life insurance policy may be obtained with an authorization for a credit card charge or electronic funds transfer. The commitment to purchase the life insurance policy received from the customer is made in accordance with parameters of the life insurance application.

Yet another feature of an online insurance application process according to the invention enables an insurance provider to receive an electronic authorization from the customer to immediately start collecting medical history information regarding the proposed insured. The screen display 290, for example, shown in FIG. 14 depicts an electronic medical authorization 292 that is provided to the customer for consideration and reply. The screen display 290 includes a specific statement of the scope of the authorization 292. If the customer agrees to the medical authorization and desires to submit the insurance application to the insurance provider, the customer (or agent acting for the customer) clicks on the button 296 indicating agreement with the medical authorization and formal submission of the insurance application to the insurance provider. Should the customer decide not to agree with the medical authorization or otherwise desire to discontinue the insurance application process, the customer (or agent) may click on the button 294, as shown. Once the application is submitted, the insurance provider may electronically refer the application to its underwriters using the underwriter communications interface 148 depicted in FIG. 2. The medical authorization 292 extends to the insurance provider and any underwriter in the employ of or acting on behalf of the insurance provider.

An authorization 292 from the customer to obtain medical records is preferably received by the insurance provider in connection with obtaining a commitment from the customer for purchase of the life insurance policy. Upon clicking the button 296 shown in FIG. 14, the customer may be presented with one or more Web pages where the customer can enter an authorization for a credit card charge or electronic funds transfer for payment of the policy premium. The medical authorization 292, as described above, may be received prior to or after obtaining a commitment from the customer to purchase the life insurance policy. Should the authorization be received prior to obtaining the purchase commitment, the authorization 292 is connected to the purchase commitment so that the authorization may be canceled should the customer not commit to purchase the life insurance policy.

In circumstances where an agent of the insurance provider is interacting directly with the customer during the process of preparing and submitting an insurance application, as described herein, the medical authorization 292 may be received as a result of the agent receiving authorization from the customer and electronically submitting the life insurance application of the customer to the insurance provider.

Still another feature of the online insurance processing provided by the present invention is a personalized certificate of temporary insurance that is generated by the TIC/TIA generator 152 (FIG. 2) and issued to a customer via an electronic data communications link. The personalized certificate is accompanied by a temporary insurance agreement explaining the temporary life insurance coverage that is extended to the proposed insured while the life insurance policy is being issued. One example of a temporary insurance certificate that is personalized by the TIC/TIA generator 152 in accordance with the present invention is shown in FIG. 15. The certificate 300 shown in FIG. 15 is configured to clearly identify the insured individual, the amount of coverage the life insurance policy will provide, and the amount of temporary coverage provided by the temporary insurance agreement. If the customer has selected an additional rider for term insurance, such information may also be provided on the temporary insurance certificate. The certificate 300 further clearly provides the application number of the insurance policy to be issued, as well as the premium amount for the insurance. A certificate 300 as shown in FIG. 15 delineates between the temporary insurance coverage and the insurance policy to be issued so that the customer better understands the scope of coverage being provided in each instance.

A temporary life insurance agreement, an example of which is shown at reference numeral 310 in FIG. 16, sets forth the features and limitations of the temporary life insurance coverage that is extended to the insured individual. The temporary life insurance coverage under this agreement is legally binding and is extended to the individual pending issuance of the purchased insurance policy.

While several preferred embodiments of the invention have been illustrated and described, it will be appreciated that various changes can be made therein without departing from the spirit and scope of the invention. The preparation of actual software instructions and computer systems to implement the invention described herein is well within the ability of persons having ordinary skill in the art of computer programming and system design. The scope of the invention therefore, The embodiments of the invention in which an exclusive property or privilege is claimed are defined as follows:

1. A computer-implemented method for online processing of a life insurance application, comprising:

under control of instructions executed by one or more computing devices in a computer system:

receiving information via an electronic data communications link that identifies an individual to be insured and describes the insurability of the individual;

generating an illustration that provides future values of a proposed life insurance policy to be issued by an insurance provider in accordance with parameters of the life insurance application, wherein the illustration is based on a projection of future performance of the life insurance policy;

obtaining a commitment from the insurance policy applicant for purchase of the life insurance policy in accordance with parameters of the life insurance application; and receiving a certification via an electronic data communications link that confirms whether the generated illustration was delivered to the insurance policy applicant at the time of commitment for purchase of the life insurance policy, wherein the certification includes at least one of:

(a) a certification from the insurance policy applicant in which the applicant explicitly confirms that the generated illustration has been received;

(b) a certification from an agent in which the agent explicitly confirms that the generated illustration has been delivered electronically to the insurance policy applicant;

(c) a certification from an agent in which the agent explicitly confirms that the generated illustration has been provided to the insurance policy applicant via a postal or courier service; or (d) a waiver from the insurance policy applicant in which the applicant explicitly confirms an understanding that the generated illustration will be delivered at the time the life insurance policy is delivered, and wherein the certification is received at the time the commitment for purchase of the life insurance policy is obtained.

2. The method of claim 1, in which the commitment for purchase of the life insurance policy is obtained by receiving an authorization for a credit card charge or electronic funds transfer for payment of a premium of the life insurance policy.

3. The method of claim 1, in which the certification is received from the insurance policy applicant and confirms receipt of the illustration at the time of commitment for purchase of the life insurance policy.

4. The method of claim 1, in which the certification is received from an agent of the insurance provider and confirms that the illustration was provided to the insurance policy applicant at the time of commitment for purchase of the life insurance policy.

5. The method of claim 4, in which the agent's certification confirms that the illustration was provided electronically to the insurance policy applicant.

6. The method of claim 4, in which the agent's certification confirms that the illustration was provided to the insurance policy applicant through postal or courier delivery.

7. The method of claim 1, in which the certification is received from the insurance policy applicant and confirms that no illustration was delivered at the time of commitment for purchase and requests that the illustration be delivered at the time the life insurance policy is delivered.

8. The method of claim 1, further comprising issuing via an electronic data communications link a temporary insurance certificate that is personalized for the individual to be insured according to the life insurance policy, accompanied by a temporary life insurance agreement specifying terms of legally binding temporary life insurance coverage that is extended to the individual pending issuance of the purchased life insurance policy.

9. A computer system for online processing of a life insurance application, comprising an application processing server configured with computer-implemented instructions that, when executed, cause the application processing server to:

receive information via an electronic data communications link identifying an individual to be insured and describing the insurability of the individual;

generate an illustration providing future values of a life insurance policy for the individual to be insured, wherein the illustration is based on a projection of future performance of the life insurance policy;

obtain a commitment for purchase of the life insurance policy to be issued by an insurance provider; and receive a certification via an electronic data communications link from the insurance policy applicant or an agent providing explicit information indicating whether the generated illustration was delivered to the insurance policy applicant at the time of commitment for purchase of the life insurance policy, wherein the certification is received at the time the commitment for purchase of the life insurance policy is obtained.

10. The computer system of claim 9, in which the application processing server is further configured to receive information via an electronic data communications link from an agent of the insurance provider confirming that the identification of the individual to be insured has been verified.

11. The computer system of claim 9, in which the application processing server is further configured to automatically confirm identification information of the individual to be insured by requesting verification from a third party based on an external electronic database maintained by the third party.

12. The computer system of claim 9, wherein the application processing server is further configured to issue via an electronic data communications link a temporary insurance certificate that is personalized for the individual according to the life insurance policy and accompanied by a temporary life insurance agreement specifying the terms of legally binding temporary life insurance that is extended to the individual pending issuance of the life insurance policy, in which the personalized temporary insurance certificate includes information identifying the individual to be insured, information identifying the life insurance policy to be issued to the individual, and the amount of insurance coverage provided by the temporary life insurance agreement.

13. The computer system of claim 9, in which the application processing server is further configured to receive an authorization via an electronic data communications link that authorizes the insurance provider to immediately begin collecting medical history information from one or more third parties concerning the individual to be insured for purposes of issuing the life insurance policy.

14. The computer system of claim 13, in which the application processing server receives the authorization in connection with obtaining the commitment for purchase of the life insurance policy.

15. The computer system of claim 9, wherein the certification includes at least one of:
   (a) a certification from the insurance policy applicant in which the applicant explicitly confirms that the generated illustration has been received;
   (b) a certification from the agent in which the agent explicitly confirms that the generated illustration has been delivered electronically to the insurance policy applicant;
   (c) a certification from the agent in which the agent explicitly confirms that the generated illustration has been provided to the insurance policy applicant via a postal or courier service; or
   (d) a waiver from the insurance policy applicant in which the applicant explicitly confirms an understanding that the generated illustration will be delivered at the time the life insurance policy is delivered.

16. A computer-implemented method for online processing of a life insurance application, the method comprising:
   under control of instructions that are executed by an application processing server:
      receiving information via an electronic data communications link identifying an individual to be insured and describing the insurability of the individual;
      generating an illustration providing future values of a life insurance policy for the individual to be insured, wherein the illustration is based on a projection of future performance of the life insurance policy;
      obtaining a commitment for purchase of the life insurance policy to be issued by an insurance provider; and
      receiving a certification via an electronic data communications link from the insurance policy applicant or an agent providing explicit information indicating whether the generated illustration was delivered to the insurance policy applicant at the time of commitment for purchase of the life insurance policy, wherein the certification is received at the time the commitment for purchase of the life insurance policy is obtained.

17. The method of claim 16, in which the application processing server receives the information via the electronic data communications link from an agent of the insurance provider confirming that the identification of the individual to be insured has been verified.

18. The method of claim 16, further comprising automatically confirming identification information of the individual to be insured by requesting verification from a third party based on an external electronic database maintained by the third party.

19. The method of claim 16, further comprising issuing via an electronic data communications link a temporary insurance certificate that is personalized for the individual according to the life insurance policy and accompanied by a temporary life insurance agreement specifying the terms of legally binding temporary life insurance that is extended to the individual pending issuance of the life insurance policy, in which the personalized temporary insurance certificate includes information identifying the individual to be insured, information identifying the life insurance policy to be issued to the individual, and the amount of insurance coverage provided by the temporary life insurance agreement.

20. The method of claim 16, further comprising receiving an authorization via an electronic data communications link that authorizes the insurance provider to immediately begin collecting medical history information from one or more third parties concerning the individual to be insured for purposes of issuing the life insurance policy.

21. The method of claim 20, in which the application processing server receives the authorization in connection with obtaining the commitment for purchase of the life insurance policy.

22. The method of claim 16, wherein the certification includes at least one of:
   (a) a certification from the insurance policy applicant in which the applicant explicitly confirms that the generated illustration has been received;
   (b) a certification from the agent in which the agent explicitly confirms that the generated illustration has been delivered electronically to the insurance policy applicant;
   (c) a certification from the agent in which the agent explicitly confirms that the generated illustration has been provided to the insurance policy applicant via a postal or courier service; or
   (d) a waiver from the insurance policy applicant in which the applicant explicitly confirms an understanding that the generated illustration will be delivered at the time the life insurance policy is delivered.

* * * * *